US009630551B2

(12) United States Patent
Verrat-Debailleul et al.

(10) Patent No.: US 9,630,551 B2
(45) Date of Patent: Apr. 25, 2017

(54) LIGHT-EMITTING DIODE MODULE FOR A VEHICLE, AND PRODUCTIONS

(71) Applicant: SAINT-GOBAIN GLASS FRANCE, Courbevoie (FR)

(72) Inventors: Adèle Verrat-Debailleul, Villers-sur-Coudun (FR); Béatrice Mottelet, Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 193 days.

(21) Appl. No.: 14/580,598

(22) Filed: Dec. 23, 2014

(65) Prior Publication Data

US 2015/0109805 A1    Apr. 23, 2015

Related U.S. Application Data

(63) Continuation of application No. 13/125,850, filed as application No. PCT/FR2009/052064 on Oct. 27, 2009, now Pat. No. 8,944,655.

(30) Foreign Application Priority Data

Oct. 27, 2008  (FR) ...................................... 08 57298

(51) Int. Cl.
*B60Q 1/26* (2006.01)
*B32B 17/10* (2006.01)
(Continued)

(52) U.S. Cl.
CPC ........ *B60Q 1/268* (2013.01); *B32B 17/10036* (2013.01); *B32B 17/10155* (2013.01);
(Continued)

(58) Field of Classification Search
CPC  B60Q 1/268; B60Q 3/0213; B32B 17/10036; B32B 17/10155;
(Continued)

(56) References Cited

U.S. PATENT DOCUMENTS 5,836,669 A * 11/1998 Hed ..................... G02B 6/0006
362/23.13
8,158,450 B1    4/2012 Sheats et al.
(Continued)

FOREIGN PATENT DOCUMENTS

DE        103 13 067 A1    10/2004
DE        203 20 918 U1    6/2005
(Continued)

OTHER PUBLICATIONS

International Search Report as issued for PCT/FR2009/052064, dated Feb. 2, 2010.
(Continued)

*Primary Examiner* — Anne Hines
(74) *Attorney, Agent, or Firm* — Pillsbury Winthrop Shaw Pittman LLP

(57) ABSTRACT

A light-emitting diode module, for a vehicle, includes a first transparent sheet having a first main face and a second main face and an edge face; the diodes each including an emitting chip able to emit one or more wavelengths in the visible, guided in the first sheet; a bracket supporting the diodes, extending as a border of the glazing and fastened to the glazing; and a seal against fluid(s), able to protect the chips and the light-emission volume of the chips before injection into the first sheet. An embodiment of the invention also relates to the manufacture of this module.

22 Claims, 9 Drawing Sheets

(51) Int. Cl.
*B60Q 3/02* (2006.01)
*F21V 8/00* (2006.01)

(52) U.S. Cl.
CPC .. *B32B 17/10293* (2013.01); *B32B 17/10541* (2013.01); *B32B 17/10761* (2013.01); *B60Q 3/0213* (2013.01); *G02B 6/0091* (2013.01); *G02B 6/0068* (2013.01); *G02B 6/0073* (2013.01); *G02B 6/0076* (2013.01); *Y10T 156/10* (2015.01); *Y10T 156/1043* (2015.01)

(58) Field of Classification Search
CPC ........ B32B 17/10293; B32B 17/10541; B32B 17/10761; G02B 6/0091; G02B 6/0068; G02B 6/0073; G02B 6/0076
See application file for complete search history.

(56) References Cited

U.S. PATENT DOCUMENTS

| | | | |
|---|---|---|---|
| 2004/0130019 | A1 | 7/2004 | Chen |
| 2006/0087864 | A1* | 4/2006 | Peng ................ B60Q 1/56 362/554 |
| 2007/0098969 | A1* | 5/2007 | Ansems ............ B32B 17/10036 428/212 |

FOREIGN PATENT DOCUMENTS

| | | |
|---|---|---|
| JP | 2001-330733 | 11/2001 |
| JP | 2002-182039 | 6/2002 |
| JP | 2004-062139 | 2/2004 |
| JP | 2004-335135 | 11/2004 |
| JP | 2006-298061 | 11/2006 |
| JP | 2008-108750 | 5/2008 |
| WO | WO 01/90787 | 11/2001 |
| WO | WO 2004/055427 | 7/2004 |
| WO | WO 2006/128941 | 12/2006 |

OTHER PUBLICATIONS

International Preliminary Report on Patentability, including the Written Opinion dated Feb. 2, 2010, as issued for PCT/FR2009/052064, dated May 31, 2011.

Official Action as issued for Japanese Patent Application No. 2011-532699, dated Jan. 7, 2014.

* cited by examiner

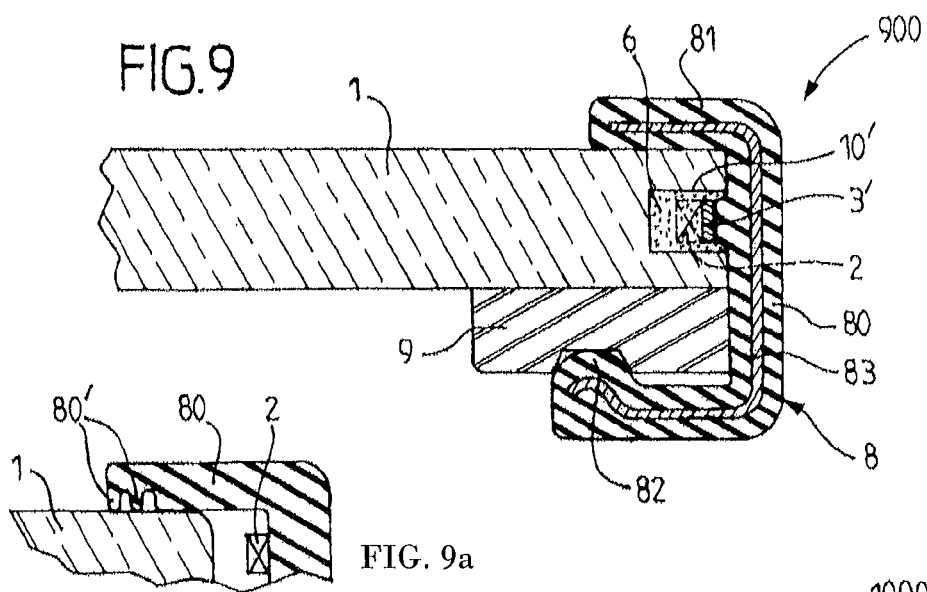
FIG. 9
FIG. 9a
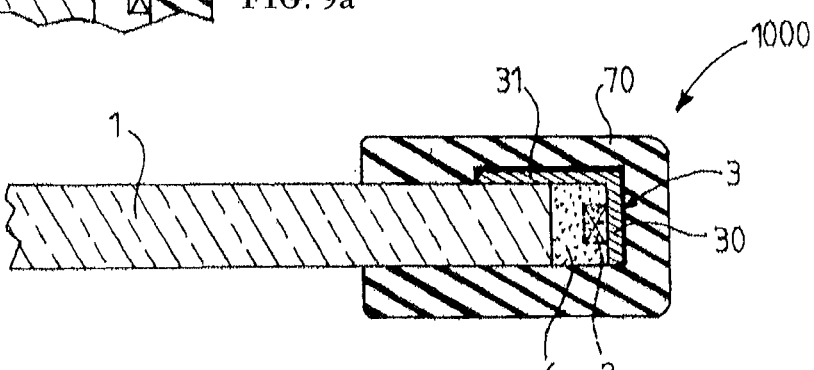
FIG. 10
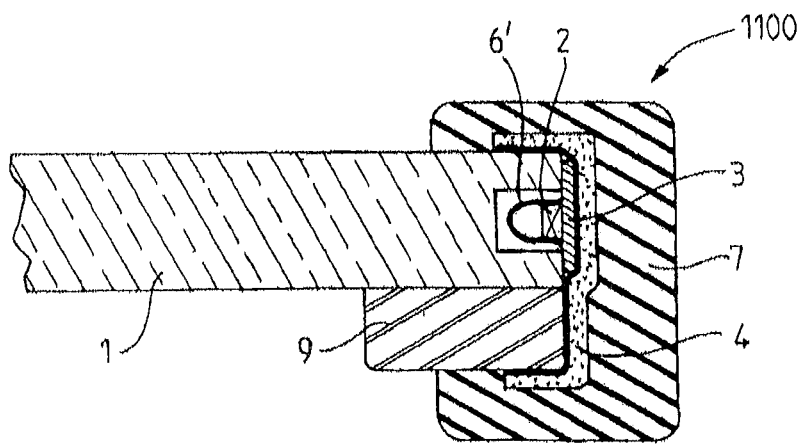
FIG. 11

LIGHT-EMITTING DIODE MODULE FOR A VEHICLE, AND PRODUCTIONS

CROSS-REFERENCE TO RELATED APPLICATIONS

This application is a continuation of U.S. patent application Ser. No. 13/125,850, filed on Jun. 24, 2011, which is the U.S. National Stage of PCT/FR2009/052064, filed Oct. 27, 2009, which in turn claims priority to French Application No. 0857298, filed Oct. 27, 2008. The content of each application is incorporated herein by reference in its entirety.

The present invention relates to automotive glazing and in particular to glazings comprising light-emitting diodes and to the method of manufacturing such glazings.

Increasingly vehicles make use of light-emitting diodes (LEDs).

Document WO 2006/128941 describes, for example, a panoramic roof with uniform illumination of the surface by one or more light-emitting diodes. This roof comprises a laminated structure which, as shown in FIG. 8, is composed of an external light-extracting sheet, a transparent central light-guiding sheet, and an internal light-diffusing sheet. The light source is a plurality of light-emitting diodes mounted on a side bracket fastened to the edge face of the internal and external sheets while a hole is provided in the central sheet for housing the diodes.

The panoramic roof is fastened by bonding the peripheral edges of the external sheet to the body of the roof. The diodes and the peripheral bonding region are masked by internal upholstery.

The invention increases the available range of illuminating roofs.

The present invention relates to a light-emitting diode module especially suitable for any roof configuration, and particularly roofs mounted from the outside onto the roof body, both sun-roofs and fixed roofs.

To do this, the LED module must be rugged, compact, with the diodes fastened in a sturdy yet simple manner.

The present invention also relates to a diode module that meets the requirements of industry (in terms of yield, therefore cost, throughput, automation, etc.), thus making a "low-cost" production possible without sacrificing performance.

For this purpose, the present invention provides a light-emitting diode module, for a vehicle, comprising:
  a glazing unit with main faces, the glazing comprising at least one first transparent sheet having a first main face and a second main face and an edge face;
  light-emitting diodes each comprising an emitting chip able to emit one or more wavelengths in the visible, guided in the first sheet, before extraction via at least one of the first and/or second faces;
  a bracket supporting the diodes, extending as a border of the glazing and fastened to the glazing (especially to the first sheet); and
  means, for sealing against fluid(s), able to protect the chips (at the least the emitting face of the chips) and the light-emission volume before injection into the first sheet (or optical-coupling volume), preferably injection via the edge face of the first sheet.

Thus the present invention provides a rugged LED module, even when the module is not protected by the body, by virtue of sealing means that are simple and well-designed and that block fluid diffusion pathways (possibly holes for passing electrical connections, if necessary).

The sealing means according to the invention may be used for a number of purposes:
  during manufacture of the module, especially for encapsulation purposes; and
  in the long term, for example 5 years, in particular to protect the chips from moisture (water, water vapor) and preferably from cleaning products or washing by high-pressure jets, and to prevent contamination of the light-emission volume (dirt, organic contamination such as molds, etc.).

To test the long-term behavior of the seal, the wet-poultice test may be used. For example the D47 1165-H7 standard used in the automotive industry describes the H7 wet-poultice test.

This test consists in embedding the test piece in cotton soaked with deionized water and enclosing the whole lot in a hermetically-sealed bag, then placing the bag in an oven at 65° C. for 7 days. Next, the test pieces are taken out of the oven and, after the soaked cotton has been removed, are kept at 20° C. for 2 hours. The test pieces may finally be inspected and mechanically or functionally tested to evaluate the effect of the moisture on the system. This test corresponds to a number of years of natural aging in a moist and hot environment.

A high-pressure waterjet cleaning test may also be used, such as the D25 5376 test of strength under high-pressure cleaning used in the automotive industry: pressure as high as 100 bar with a nozzle/housing distance of up to 100 mm.

The diode bracket has a surface that bears chips "facing" the glazing, generally facing the edge face of the first sheet or (partially) facing a main face of the glazing and protruding from the edge of the first sheet, in the case of edge-emitting diodes.

The means for sealing against fluid(s) may be chosen from:
  an adhesive, called an external adhesive, optionally placed on the surface of the diode bracket, which is opposite the surface facing the glazing, bearing diodes and protruding beyond the periphery of the glazing, the adhesive optionally forming all or part of the fastening means of the glazing bracket, the adhesive optionally having an uncovered, rigid, protruding core;
  an adhesive strip or strips, optionally an enveloping strip, with a part covering the bracket prolonged by the projecting parts;
  an adhesive tape or tapes, or an enveloping tape; and/or
  sealing means between the glazing and the diode bracket, chosen from
    an adhesive material for filling the light-emission volume that is transparent at said wavelength(s), preferably an adhesive, a thermoplastic resin or a double-sided adhesive; or
    an adhesive material for protecting the light-emission volume, which adhesive is placed in regions where the bracket makes contact with the glazing, is transparent at said wavelength(s) of the diodes if it partially fills the coupling volume, and/or is placed to seal the free parts of the diode bracket (the sides for example, in. other words lateral sealing of the coupling volume); and
    a chip-protecting material, transparent at said wavelength(s), identical to or separate from the filling material, especially a material for pre-encapsulation of the chips.

In one embodiment, the adhesive chip-protecting material transparent at said wavelength(s) is identical to the filling material and is chosen from:

an adhesive, embedding the chips and fastening the chips to the glazing; or a double-sided adhesive, bonded to the chips and the bracket via one adhesive-coated side and bonded to the glazing by the other adhesive-coated side, forming all or part of the fastening means of the bracket.

The light-emission volume (coupling volume) naturally varies depending on the radiation pattern of the chips, defined by a main emission direction and an emission cone.

To make manufacture simple (independent of the radiation pattern), the whole volume between the edge face and the chips (whether pre-encapsulated or not), optionally bounded by one or the flanges of the bracket, is filled with the adhesive material.

In a first variant, the module comprises a polymer encapsulation, especially being from 0.5 mm to a plurality of cm in thickness, located bordering the glazing and covering the bracket for fastening (via the surface opposite the surface that bears diodes and/or via the edge face of the bracket, or, more generally, via any free surface of the support outside of the optical-coupling volume), the means for sealing against fluid(s) being then chosen (at least) to seal against (i.e. to be sufficiently resistant to) the liquid encapsulation material injected at a given temperature and pressure.

When applied to vehicles, the encapsulation material is black or tinted (for esthetical reasons and/or for masking purposes). Since this material is not sufficiently transparent at the visible wavelength(s), the sealing means are necessary to ensure good injection of the light into the first sheet.

The encapsulation may be made of polyurethane, especially of RIM-PU (reaction injection molding polyurethane), the crosslinking of the PU organic component occurring in the mold, once both components have been simultaneously injected. This material is typically injected at temperatures as high as 130° C. and at a few tens of bar.

Other encapsulation materials are:
preferably flexible thermoplastics: thermoplastic elastomer (TPE), polyvinyl chloride (PVC), ethylene-propylene-diene terpolymer (EPDM), typically injected between 160° C. and 240° C. and at up to 100 bar; and
rigid thermoplastics: polycarbonate (PC) polymethyl methacrylate (PMMA), polyethylene (PE), polypropylene (PP), polyimide (PA66), acrylonitrile butadiene styrene (ABS), ABSPC, typically injected between 280° C. and 340° C. and between 500 and 600 bar.

The temperature used is preferably lower than the temperature used when connecting the chips (soldering etc.), for example lower than 250° C., even lower than or equal to 200° C. To test the tightness of the seal against this injected material, optical performance could be compared before and after encapsulation.

As adhesive materials (whether external or internal) providing this sealing function against the encapsulation, in the short term, mention may be made of:
a UV-curable adhesive (whether internal or external);
a strip (acrylic, PU, etc.) coated with an acrylic adhesive (whether internal or external);
a transparent adhesive (whether internal or external), PU, silicone, acrylic; and
a thermoplastic resin (whether internal or external), polyvinyl butyral (PVB), ethylene vinyl acetate (EVA) copolymer etc.

The encapsulation extends along the edge face of the first sheet and at least one edge of the first main face. By surrounding said coupling volume (and most often the diodes and the diode bracket, via the free surfaces outside of the coupling volume), this encapsulation may form additional means for sealing said coupling volume against fluid(s)—for example more efficient long-term sealing means, optionally reinforced with a 5 to 30 μm thick, single-, two- or three-component primary layer, for example based on polyurethane, polyester, polyvinyl acetate, isocyanate, etc.—located between the encapsulation and the glazing, in particular glazing made of mineral glass (because the layer promotes adhesion to mineral glass).

Furthermore, in the case of an encapsulation on mineral glass, it may be preferred to proscribe silicone adhesives as external adhesives, because they adhere very well to the glass but will prevent adhesion of the material encapsulated on the glass.

The encapsulation also provides a good esthetic finish and allows integration of other elements or functionalities:
overmolded frames;
one or more reinforcing inserts for fastening the module, especially for modules that open; and
multi-lipped sealing strip (two-lipped, three-lipped, etc.), compressed after mounting on the vehicle.

The encapsulation may take any form, with or without lip, double sided, triple sided.

Tubing, in other words a closed-cell sealing band, may also be bonded to the encapsulation.

Preferably, in the case of an external adhesive, a free space is left on the edge face of the glazing associated with the diode bracket to allow a flush encapsulation i.e. flush with one of the faces of the glazing, etc.

In a second variant, the module comprises a premounted polymer seal, for example made of an elastomer, especially of TPE (thermoplastic elastomer), or EPDM, having a thickness of a few mm (typically between 2 and 15 mm). The seal may optionally form the supporting bracket for fastening to the glazing (the diodes possibly being furthermore on an additional backing), or the seal may cover all or part of the bracket supporting the diodes.

The seal extends along the edge face of the first sheet and on the periphery of the main faces of the glazing (first sheet and optionally the second sheet). It may be adhesive coated for its retention. The U-shaped seal may more preferably be held simply by pinching or interfitting with the two main faces of the glazing, which are the first and second face of the first sheet in the case of a single glazing.

The seal may be of any shape: L-shaped (extending onto the first main face), U-shaped (extending onto the first main face and, for example, onto the second main face), etc.

The seal may bear the diodes and the backing or fitting bearing the diodes (having a rectangular cross section, for example). The seal (associated with the backing) may here form the bracket for fastening to the glazing.

The seal may comprise a metal core.

The seal may be demounted at any time especially when there is no adhesive between the seal and the diodes in the coupling volume. By surrounding the volume, it may nevertheless form said means for sealing said volume (and diodes) against fluid(s), means which are for example effective in the long term, formed by one or more lips of the seal, made of elastomer, compressed after fastening and arranged on the main faces of the glazing.

The elastomer, especially EPDM, has a sealing function and good compression set properties.

However, so that the bracket and the diodes are positioned correctly, the means for sealing said volume against fluid(s) used may preferably lie between the seal (without a sealing lip) and the periphery of the glazing.

The bracket may be fastened to the glazing before the seal is mounted, the seal is then mounted using any available means (pinching of the U-shaped bracket, bonding using a double-sided adhesive, etc.).

The seal with the diodes may be preferably mounted in an assembly operation, with a single translational movement (by pinching, interfitting, etc.).

As effective long-term means for sealing against moisture and/or cleaning:
- polyvinyl butyral (PVB) and ethylene vinyl acetate (EVA) copolymer are avoided;
- a (transparent if internal) double-sided adhesive, an (external) single-sided adhesive or a (transparent if internal) adhesive is preferred.

The external adhesive may be an adhesive-coated strip:
- monolithic, common with the diode assembly; or
- in pieces, per diode or group(s) of diodes.

For example, a 0.5 mm thick acrylic strip is chosen.

The strip (having any possible shape) is fastened to the periphery of the glazing, by the edge face of the glazing and/or by one or more main faces of the glazing.

The strip, then called an enveloping strip, may entirely cover the bracket on bottom and top parts and on side parts. In short, the band has dimensions (width and length) greater than the dimensions of the emergent part of the diode bracket.

The strip may also cover the bracket only on bottom and top parts and not on the side parts (or sides) of the supporting bracket. To make the passage of the connecting medium easier, through-holes may be made in the strip.

Generally, the side parts (or sides) of the supporting bracket are sealed against fluid(s) (encapsulation and/or long-term encapsulation) using "local" adhesive means such as those described above: adhesive, resin, etc.

If the connecting medium passes between the bracket and the glazing, through-holes may be made in the adhesive.

The adhesive strip may comprise a rigid core (metal, etc.) that protrudes beyond the edge of the strip and that is uncovered, so as to make removal of the strip easier when the vehicle is to be repaired or when the diodes are to be changed, etc.

To quantify the transparency of the internal sealing means to the wavelength(s), materials with an absorption coefficient of 25 $m^{-1}$ or less, or even more preferably 5 $m^{-1}$, may preferably be chosen.

Moreover, to minimize losses at the interface with the first sheet, a refractive index that matches as closely as possible that of the first sheet may furthermore be chosen, for example a index difference of 0.3 or less, even 0.1.

The coupling edge or edges of the first sheet may preferably be rounded. Thus, in particular when the light-emission volume is air-filled, it is possible to use the refraction at the interface between the air and the appropriately-shaped first sheet (rounded edge, even a beveled edge, etc.) to focus the rays in the first sheet.

The coupling edges of the first sheet may preferably be roughened (diffusing). In this case, the scattering losses are limited by virtue of the internal adhesive sealing means because the adhesive is incorporated in the anfractuosities of the roughened edge.

The transmission factor of the first sheet, near the emission peak in the visible of the chips (perpendicular to the main faces) is preferably 50% or higher, even more preferably 70% or higher, and even 80% or higher.

The bracket may comprise a side part facing the edge face of the first sheet and bearing chips.

The glazing may have a layer, called a protective layer, (a sheet, a film, a deposit, etc.) at least as a border of one of the first or second faces or extending over said face. This layer may have a dual function:
- light extraction (for example a flexible film made of PU, PE or silicone optionally bonded using acrylic);
- radiation protection (IR, UV): solar control or low-E layers;
- anti-scratching; or
- esthetic (tinted, with patterns, etc.).

This protective layer may be:
- a layer that is transparent at the wavelength(s) of the chips, that protrudes, extending onto the edge face between the side part of the bracket and the edge face, and filling the light-emission volume and/or embedding said (preferably not pre-encapsulated) chips; or
- a layer (either transparent or opaque, etc.) protruding with a turned-down part covering the side part, thus forming said external adhesive, and even enveloping and/or bearing said bracket.

The protruding layer may even form a complete surround as far as the first or second faces, thus forming the enveloping external adhesive.

The turned-down part may even bear the side part (backing, etc.) For this purpose, the external face of the side part may be equipped with anchoring means (burrs, etc.).

The protective layer may be a material softened by heating to become adhesive (PVB for example) or made of a material with adhesive sides (adhesive-coated material) such as PE, PU, PET.

The glazing may be single glazing (a single sheet), the first sheet being made of glass or plastic, especially PC, etc.

The glazing may be laminated (several sheets) formed from:
- a first, thick or thin, transparent, mineral glass (float glass, etc.) or organic (PC, PMMA, PU, ionomer resin, polyolefin) sheet;
- a lamination interlayer made of a given lamination material; and
- a second sheet (whether opaque or not, transparent, tinted, made of mineral glass, or an organic material having various functions: solar-control, etc.).

Conventional lamination interlayers include flexible PU, a plasticizer-free thermoplastic such as ethylene vinyl acetate (EVA) copolymer or polyvinyl butyral (PVB). These plastics are for example between 0.2 mm and 1.1 mm thick, especially between 0.38 and 0.76 mm thick.

The first sheet/interlayer/second sheet combination may especially be chosen to be:
- mineral glass/interlayer/mineral glass;
- mineral glass/interlayer/polycarbonate; or
- polycarbonate (whether thick or not)/interlayer/mineral glass.

In the present description, unless specified, the term "glass" is understood to mean a mineral glass.

It is possible to cut the edge of the first sheet (before tempering) of single or laminated glazing so as to house the diodes therein.

The structure may comprise laminated glazing formed from the first glass sheet, a lamination interlayer chosen to be diffusing, for example translucent PVB, so as to spread the light, and a second glass sheet, optionally with an external main face that is diffusing (because of a texture or an additional layer).

In another embodiment, with the laminated glazing and preferably an encapsulation as mentioned above, the first sheet comprises a recess for housing the diodes and opening onto the first and second main faces, the supporting bracket, preferably a rectangular strip, is against, preferably bonded to, the periphery of the lamination face of the second sheet so as to eliminate stray light from the second sheet when the optional encapsulation is flush with the face of the second sheet opposite the lamination face.

However, preferably, the glazing is single glazing, even made of plastic, so as to be more compact and/or lighter.

The first and/or second sheets may be of any shape (rectangular, square, round, oval, etc.) and either planar or curved.

The first sheet may preferably be made of a soda-lime glass, for example Planilux glass from Saint Gobain Glass.

The second sheet may be tinted, for example made of Venus glass from Saint Gobain Glass.

The glass may optionally have previously been subjected to a heat treatment of the hardening, annealing, toughening or bending type.

The extraction face of the glass may also be frosted, sand-blasted, screen-printed, etc.

In the variant with the protective layer, the support comprises a flange on the face of the first sheet, in contact with the protective layer, the flange being discontinuous so that said protective layer can fill the light-emission and/or chip volume, and preferably having anchor regions projecting into the protective layer.

For manufacture, a prefolded protruding layer is provided and this layer is suitably cut on the bracket side (a cut complementary to the shape of the flange of the bracket, especially full regions that fill the coupling space and/or embed the chips).

Naturally, the bracket may alternatively comprise a flange associated with the top face of the protective layer or a second sheet, in which case the shape of this flange is not adjusted.

The anchoring regions are rather triangular or in any case pointed and narrow.

The support may furthermore comprise a bottom part associated with the bottom face of the first sheet. This part may be full or may have recessed parts.

The maximum width of the bottom part is optionally greater than the maximum width of the top part, especially greater or equal (because of lamination stresses).

The length of the second flange may vary from 3 to 30 mm. The length of the anchoring regions may vary from 3 to 10 mm, in particular when anchoring in a thermoplastic sheet.

Moreover, the edge face, the corner or the edge of one of the faces of the first sheet may comprise a recess wherein the chips are placed, especially a chip-housing groove.

The first sheet may comprise recesses with high radii of curvature for the glass.

The recess may be a lateral groove, along the edge face, optionally opening onto at least one side so as to make mounting easier.

For increased compactness, and/or to reduce or increase the window region, the chip to first sheet distance may be less than 2 mm.

In particular, it is possible to use chips having a width of 1 mm, a length of 2.8 mm and a height of 1.5 mm.

The bracket may be on the periphery of the edge or edges of the module (on the edge face of the first sheet and/or on the bottom face of the first sheet and/or on the top face of the first sheet).

The bracket may have a length (and/or width, respectively) less than the length (or width, respectively) of the coupling edge of the first sheet.

The bracket may be perforated so that an external adhesive can embed the chips and/or fill the optical-coupling volume.

The bracket may be made of a flexible, dielectric or electrically conductive material, for example a metal (aluminum etc.), or a composite.

The bracket is naturally a sealant against fluid(s) (injection and/or long-term material), unless this function is, as is possible, performed by another external enveloping element (external adhesive, premounted seal, etc.).

The bracket may be monolithic or made of a plurality of pieces.

The bracket may be produced by folding.

A simple bracket is preferred (whether of variable cross section or not, L-shaped, U-shaped, E-shaped, even a simple rectangular strip), sturdy and easy to mount.

Notches may be provided in the glazing to promote the fastening (clipping, etc.).

The bracket may have a local L-shaped cross section and:
 at least one (substantially planar) side part facing the edge face of the glazing, preferably bearing diodes; and
 be prolonged by a flange facing one main face of the glazing (and on the periphery).

The bracket may have a (local) U-shaped cross section, and comprise:
 at least one (substantially planar) side part facing the edge face of the glazing, preferably bearing diodes; and be
 prolonged by a flange facing one main face of the glazing (and on the periphery); and be
 prolonged by another flange facing another main face of the glazing on the periphery.

The total number of diodes is defined by the size and position of the regions to be illuminated, by the desired light intensity and the required uniformity of the light.

The length of the bracket varies, depending on the number of diodes and the extent of the area to be illuminated, especially from 25 mm to the length of the edge of the glazing (for example 1 m).

The bracket is preferably retained (at least partially) by pinching the glazing or by interfitting, preferably pinching or interfitting with the first sheet.

For an increased compactness and/or a simplified design, the bracket may furthermore have one or more of the following features:
 it may be thin, especially less than or equal to 3 mm thick, for example between 0.1 and 3 mm thick, or thinner than a lamination interlayer, if required;
 it may be opaque, for example made of copper or stainless steel; and/or
 it may extend along the entire length of a hole forming a groove.

A plurality of identical or similar diode brackets may be provided instead of a single bracket, especially if the regions to be illuminated are very distant from one another.

A bracket with a given reference size, multiplied depending on the size of the glazing and the requirements, may be provided.

For increased compactness and/or to increase the window region of the glazing, the distance between the part bearing chips and the first sheet is preferably less than or equal to 5 mm, and/or preferably the distance between the chips and the first sheet is less than or equal to 2 mm. In particular, it is possible to use chips having a width of 1 mm, a length of 2.8 mm and a height of 1.5 mm.

The invention also covers the bracket supporting the diodes (preferably with the diodes) and for fastening to a vehicle-borne module such as that described in the preceding embodiments.

The invention also covers the bracket supporting the diodes of local U-shaped or L-shaped cross section for fastening to an edge of a vehicle-borne glazing, comprising a middle part (provided for bearing diodes) prolonged by a discontinuous flange, with recessed regions and optionally projecting regions for anchoring in a layer on the glazing.

The invention also covers a premountable seal, for said vehicle-borne diode module equipped with a diode bracket (for example having a local U-shaped or L-shaped cross section, or being a simple rectangular strip) and with regions for fastening the seal by pinching or interfitting (clipping) to the glazing.

The invention also covers a premountable seal for said vehicle-borne diode module, made of an elastomer, and with one or more lips for sealing against fluid(s).

The diodes may be (pre)assembled on a backing or backings (with tracks for the supply of power) that is/are preferably thin, especially being less than or equal to 1 mm thick, even 0.1 mm thick, which backings are fastened to the (for example metal) brackets.

Otherwise the bracket itself may bear directly the chips and the tracks for the supply of power.

The module is intended to equip any vehicle:
side windows, roof, rear window, windshield, of a land-based vehicle: an automobile, service vehicle, truck or train;
a window or windshield of an airborne vehicle (airplane, etc.); and
windows or roof of an aquatic vehicle (boat or submarine).

The light extraction (the type and/or the position of the chips) is adjusted to provide:
an ambient light or a light for reading, especially visible inside the vehicle;
a luminous signal, especially visible outside the vehicle:
activated using a remote control: so as to locate the vehicle in a parking lot or elsewhere, or to indicate the (un)locking of the doors; or
a safety signal, for example rear brake lights; or
a light that is substantially uniform over the entire light-extraction surface (one or more light-extraction regions, common or separate functions).

The light may be:
continuous and/or intermittent; and
monochromatic and/or multichromatic, white.

Visible inside the vehicle, it may thus have a nighttime-illumination function or a display function for displaying all kinds of information, such as designs, logos, alphanumeric signs or other signs.

As decorative patterns, one or more luminous strips or a peripheral luminous frame may be formed.

It is possible for a single extraction face (preferably inside the vehicle) to be provided.

The insertion of diodes into these glazings makes the following other signaling functionalities possible:
display of indicator lights intended for the driver of the vehicle or for the passengers (for example: an engine temperature warning light displayed on the windshield of the automobile, an indicator showing that the system for electrically deicing the window is in operation);
display of indicator lights intended for persons outside the vehicle (for example an indicator, in the side windows, showing that the vehicle alflange is in operation);
luminous display on vehicle windows (for example a flashing luminous display on emergency vehicles, a security display with low power consumption, indicating the presence of a vehicle in danger).

The module may comprise a diode that can receive control signals, especially in the infrared, for remote control of the diodes.

Naturally, the invention also relates to a vehicle incorporating the module defined above.

The diodes may be simple semiconductor chips, for example having a size of about 100 µm or 1 mm.

The diodes may however comprise a protective packaging (whether temporary or not) for protecting the chip during handling or to improve the compatibility between the chip materials and other materials.

The diodes may be packaged, i.e. they may comprise a semiconductor chip and packaging, for example made of an epoxy-type resin or of PMMA, encapsulating the chip and the functions of which are multifarious: protection against oxidation and moisture, diffusing or focusing element, wavelength conversion, etc.

The diode may especially be chosen from at least one of the following LEDs:
a diode with electrical contacts on opposite faces of the chip, or on the same face of the chip;
a side-emitting diode, i.e. emitting parallel to the (faces of the) electrical contacts, with a lateral emitting face, relative to the bracket;
a diode, the main emission direction of which is perpendicular or oblique to the emitting face of the chip;
a diode having two main emission directions oblique to the emitting face of the chip, giving a batwing shape, the two directions for example being centered on angles between 20° and 40° and between −20° and −40° with apex half-angles of about 10° to 20°;
a diode having (only) two main emission directions oblique to the emitting surface of the diode, centered for example on angles between 60° and 85° and between −60° and −85°, with apex half-angles of about 10° to 30°; and
a diode placed for guiding in the edge face or to emit directly via one or both faces, or via the hole (the diode is then called an inverted diode).

In one variant, the diodes are edge-emitting diodes, the emitting faces facing the edge face of the first sheet and the diodes being arranged on the supporting bracket for fastening, preferably a rectangular strip, against and/or bonded to one of the main faces of the glazing preferably by a double-sided adhesive.

The emission pattern of a source may be Lambertian.

Typically, a collimated diode has an apex half-angle that may be as low as 2° or 3°.

The module may thus incorporate all functionalities known in the glazing field. Among functionalities that may be added to the glazing, mention may be made of the following: a hydrophobic/oleophobic layer, a hydrophilic/oleophilic layer, an antisoiling photocatalytic layer, a heat-reflecting (solar control) or infrared-reflecting (low-E) multilayer or an antireflection layer.

The structure may advantageously comprise a diffusing mineral layer associated with one of the main faces, which is an illuminating face (by extraction of the light).

The diffusing layer may be composed of elements, containing particles and a binder, the binder being used to agglomerate the particles together.

The particles may be metal particles or metal oxide particles, the size of the particles may be between 50 nm and 1 μm, and preferably the binder may be a mineral binder for heat resistance.

In a preferred embodiment, the diffusing layer consists of particles agglomerated in a binder, said particles having a mean diameter of between 0.3 and 2 microns, said binder being in a proportion of between 10 and 40% by volume, and the particles forming aggregates, the size of which lies between 0.5 and 5 microns. This preferred diffusing layer is particularly described in patent application WO 01/90787.

The particles may be chosen from semitransparent particles and preferably from mineral particles such as oxide, nitride or carbide particles. The particles will preferably be chosen from silica oxides, alumina oxides, zirconium oxides, titanium oxides and cerium oxides, or a mixture of at least two of these oxides.

For example, a diffusing mineral layer of about 10 μm is chosen.

The invention also relates to a method of manufacturing the diode module, for a vehicle, as defined above, comprising the following steps:
supplying a glazing unit comprising the first transparent sheet, said protective layer protruding over the edge of the first sheet;
supplying the diode bracket, comprising a side part to be placed facing the edge face of the first sheet, and bearing the chips;
and one of the following steps:
for its adhesion, softening the protruding part, called the internal part, of the layer onto the edge face of the first sheet (by heating the added bracket and/or the glazing) and placing the bracket against the softened protruding part which fills the light-emission volume and/or embeds the chips; or
for its adhesion, softening the protruding part, called the external part, onto the previously fastened bracket (by heating the bracket and/or the glazing), preferably enveloping the bracket and adhering to the second face; or
the turning down of the protruding part, called the external part, of an adhesive-coated protective layer, onto the bracket, preferably enveloping the bracket and adhering to the second face,
and preferably the injection of the encapsulation material onto the edge of the glazing with the diodes.

The invention also relates to a method of manufacturing the diode module, for a vehicle, as defined above, comprising the following steps:
supplying a glazing unit comprising at least the first transparent sheet;
supplying the bracket supporting the diodes;
fastening the bracket supporting the diodes to the glazing;
placing an adhesive, called an external adhesive, especially one or more adhesive strips or adhesive tapes, on the periphery of the glazing and surrounding said volume;
injecting the polymer encapsulation material, preferably at a temperature of 250° C. or lower, even at 200° C., onto the edge of the glazing with the diodes, and surrounding said volume and said external adhesive, which then form means for sealing said volume against the encapsulation material.

The invention also relates to a method of manufacturing the diode module, for a vehicle, as defined above comprising the following steps:
supplying a glazing unit comprising at least the first transparent sheet;
supplying the bracket supporting the diodes; fastening the bracket supporting the diodes to the glazing using an adhesive that fills said volume and optionally embeds the diodes (so as to seal the light-emission volume of the chips during injection), the fastening optionally being preceded by a pre-positioning of the bracket using an adhesive on the periphery of one of the faces of the glazing;
injecting the polymer encapsulation material, preferably at a temperature of 250° C. or lower, even at 200° C., onto the edge of the glazing with the diodes, surrounding said volume and the adhesive means forming the means for sealing said volume against the encapsulation material.

The following may also be envisioned:
supplying a premounted seal, bearing, on its internal face, chips embedded in an adhesive, optionally softened by heating (to make it adhesive and/or to make it match the edge face as best as possible);
mounting the seal onto the edge face of the glazing by pinching or interfitting (or clipping) it, until the adhesive makes contact with the edge face;
or else:
supplying a bracket, for fastening diodes, having an optionally variable U- or L-shaped cross section, with chips embedded in an adhesive, optionally softened (to make it adhesive and/or to make it match the edge face as best as possible);
mounting the bracket on the onto the edge face of the glazing by pinching or interfitting (or clipping), until the adhesive makes contact with the edge face.

Other details and advantageous features of the invention will become clear on reading about examples of modules according to the invention illustrated in the following figures:

FIGS. 1A, 2A, 2C, 3 to 12, 15 and 16 show partial schematic views in cross section of diode modules in various embodiments of the invention;

Figure 1A:
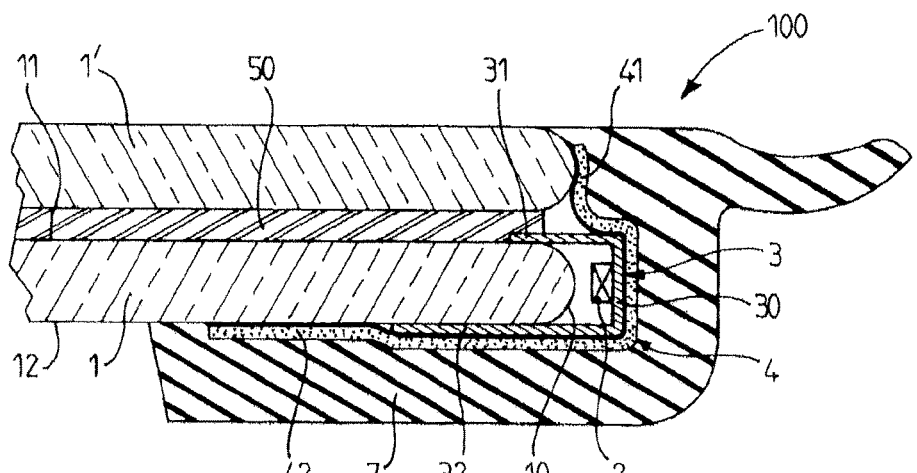

For the sake of clarity the various elements of the objects shown are not necessarily drawn to scale.

FIG. 1 shows a partial schematic view in cross section of a diode module 100 in a first embodiment of the invention.

This module 100 comprises laminated glazing comprising:
a first, for example rectangular, transparent sheet 1 having a first main face 11 and a second main face 12, and a preferably rounded edge face (so as to avoid flaking), for example a soda-lime-silica glass 2.1 mm in thickness; and
a second glass sheet 1', 2.1 mm in thickness, optionally tinted to provide a solar-control function (for example VG10 Venus glass) and/or covered with a solar-control coating.

The second glass sheet 1' being laminated by way of a lamination interlayer 50, for example a PVE interlayer 0.76 mm in thickness.

A bracket 3 supporting light-emitting diodes borders the glazing and is fastened to the first glass sheet. This bracket is monolithic, made of thin metal (stainless steel, aluminum, etc.) 0.2 mm in thickness.

The diode bracket has a variable, substantially U-shaped cross section (as shown in detail by the side view in FIG. 3) and comprises:
- a side part 30 facing the edge face 10 of the first sheet, and bearing diodes; and is
- prolonged by a first flange 31 that makes contact with the main face of the glazing (and on the periphery); and is
- prolonged by a second flange 32 facing another main face of the glazing (and on the periphery).

The gap between the two flanges 31, 32 is substantially equal to the thickness of the first sheet.

The first flange has a variable cross section: it has, preferably V-shaped, projecting regions for anchoring in the interlayer 50, separated by recessed regions, for example rectilinear regions 311.

The bearing length of the first flange in the anchoring regions is small, for example from 2 to 10 mm, in order to take into account the presence of the interlayer 50.

The second flange may also have a variable cross section: it has projecting regions 320, of any possible shape, so as to reinforce the fastening, and recessed regions, for example rectilinear regions 321.

In the recessed regions 321, the second flange makes linear contact with the face 12 so as to create a first level seal against the encapsulation material and/or to contain an internal sealing means during mounting, for example an adhesive.

The bearing length of the second flange in the projecting regions 320 is for example from 2 to 30 mm.

The projecting regions 320 and the anchoring regions 310 may be facing, even offset.

As a variant, the bracket has a first flange on the face 12' of the second glass sheet.

The light-emitting diodes each comprise an emitting chip 2 able to emit one or more wavelengths in the visible, guided in the first sheet. The diodes are small, typically a few mm or less in size, especially about 2×2×1 mm in size, without optics (lens) and preferably not pre-encapsulated so as to minimize bulk.

The distance between the part bearing diodes and the edge face is minimized, for example from 5 mm. The distance between the chip and the edge face is from 1 to 2 mm.

The main emission direction is perpendicular to the face of the semiconductor chip, for example with a multiple quantum-well active layer, in AlInGaP or another semiconductor technology.

The light cone is a Lambertian cone of ±60°.

The light is preferably extracted (not shown here) via the face inside the vehicle, by any means: a diffusing layer, sand-blasting, screen-printing, etching with an acid, etc.

Therefore, a light-emission volume is defined between each chip and the edge face of the first sheet.

Each chip and the light-emission volume must be protected from any pollution: water, chemicals, etc. both in the long term and during the manufacture of the module 100.

In particular, it is useful to provide the module with a polymer encapsulation 7, about 2.5 mm in thickness, on the border of the glazing. This encapsulation, here covering the diode bracket, ensures a long-term seal (against water, cleaning products, etc.).

The encapsulation also provides a good esthetic finish and allows integration of other elements or functionalities (reinforcing inserts, etc.).

The encapsulation 7 has a lip, and is double sided. The encapsulation 7 is for example made of black polyurethane, especially RIM-PU (reaction injection molding polyurethane). This material is typically injected at temperatures of up to 130° C. and at a few tens of bar.

The black encapsulation material is not transparent at the visible wavelength(s) of the diodes. Therefore, to ensure good injection of the light into the first sheet, sealing means are used to seal against the liquid encapsulation material.

To do this, once the diode bracket 3 has been fastened, and before the injection, an external adhesive 4 is placed on the surface of the diode bracket opposite the surface facing the glazing, adhesive 4 protruding over the periphery of the glazing, and bonded at one end to the edge face of the second glass sheet 1' and at the other end to the face 12.

This may be an acrylic strip coated with an acrylic adhesive 0.4 mm in thickness.

For a flush encapsulation, it is preferable for a top part of the edge face 1' to be left free.

As shown in the partial side views of the module 100 (which do not show the encapsulation):
- the strip 4 may partially protect the chips and the coupling volume (top and bottom protection), a sealing means 43' such as an adhesive is added as a side protection, sealing the lateral ends of the bracket (cf. FIG. 1B); or
- the strip 4 may completely protect the chips and the coupling volume by way of side parts 43 that protrude beyond the bracket 3 (cf. FIG. 10).

The connecting medium 9' may protrude from the strip 4.

As a variant, adhesive tapes are used.

The module 100 may for example form a fixed panoramic roof of a land-based vehicle, or as a variant of a boat, etc. The roof is mounted from the outside, as shown in FIG. 1D, onto the body 90 using an adhesive 91.

As a variant, shown in FIG. 1E, the encapsulation of the module 100 has been modified as follows:
- the lip has been removed;
- inserts 93 for fastening/opening the module have been added; and/or
- EPDM tubing 92, in other words a closed-cell sealing band, or else a multi-lipped sealing band, has been added against the encapsulation, the band being compressed after mounting on the vehicle.

The multi-lipped sealing band may also be incorporated into the encapsulation.

The first sheet is on the inside of the vehicle. Light is preferably extracted via the face 12.

Diodes (aligned on the bracket) emitting a white or colored light may be chosen for an ambient lighting, or a light for reading, etc.

The bracket may be on a lateral or longitudinal edge of the sheet 1.

A number of brackets may of course be provided on a given edge or on separate edges, the brackets having identical or separate functions (the power, the light emitted, the position and extent of the light-extraction regions, may be suitably chosen).

The light-extraction may form a luminous design, for example a logo or a trademark, or a light show (for children etc.).

Figure 2A:
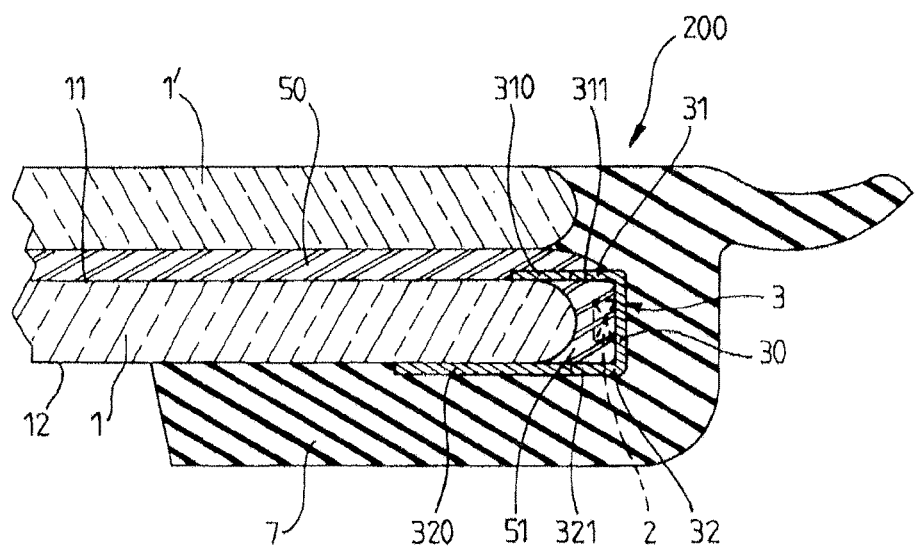
Figure 2B:
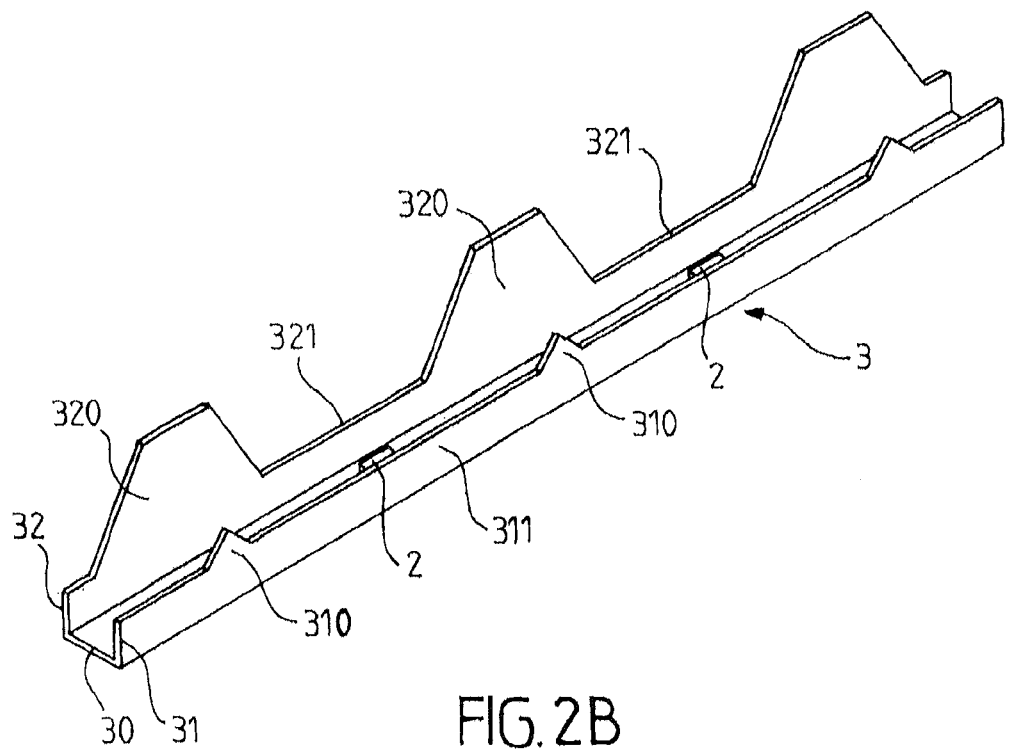
FIG. 2B shows a schematic side view of a bracket for fastening diodes, according to the invention.

FIG. 2A shows a partial schematic view in cross section of a diode module 200 in a second embodiment of the invention.

This module 200 differs from the module 100 in the means for sealing against the encapsulation material.

This is because the PVB lamination interlayer has a part 51 protruding between the edge face of the first sheet 1 and the side part 30 of the bracket. This part is made to bond to the edge face by softening the PVB and embeds the chips.

More precisely, the edge of the PVB may be pre-cut so as to have protruding parts under the recessed regions 311 of the flange 31, which do not bear on the face 12 (cf. FIG. 3 also), and parts for housing anchoring regions 310.

As a variant, the flange 31 is fastened to the external face of the second sheet. The flange may therefore be full (i.e. have a uniform cross section) and longer.

Figure 2C:
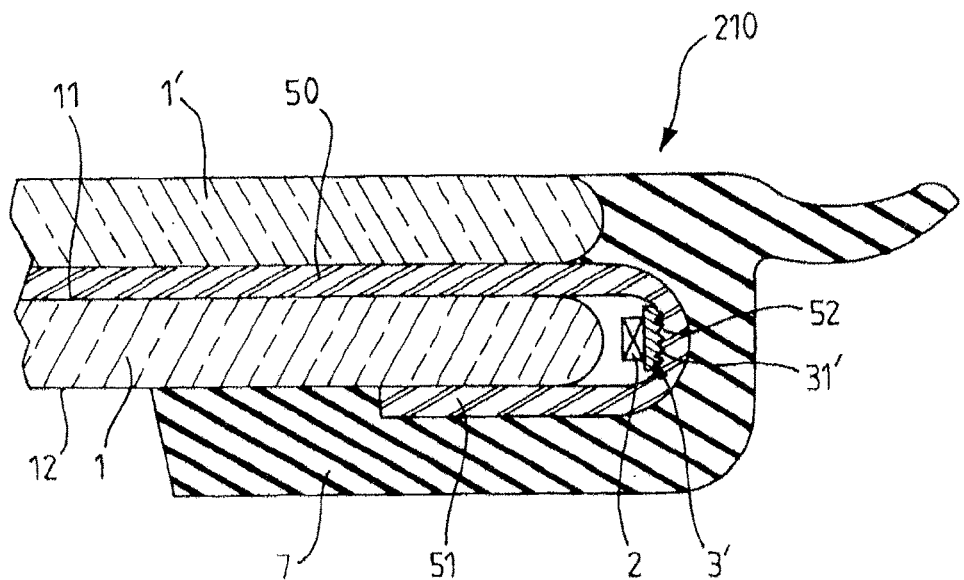

FIG. 2C shows a partial schematic view in cross section of a diode module 210 in a variant of the second embodiment of the invention.

This module 210 differs from the module 200 in the positioning of the protruding part 51 which this time covers the diode bracket 3'. The bracket 3' may be a flangeless bracket, of rectilinear cross section, rectangular for example, for example a printed circuit board (PCB).

Furthermore, the bracket is premounted on the protruding part before it is turned down and, so as to make its anchoring easier, it may comprise burrs 52 on its external face 31' or side face.

In addition, the protruding part envelopes the bracket and bonds to the edge of the face 12. Also, in this configuration, the sheet 50 serves to fasten chips to the glazing.

Figure 3:
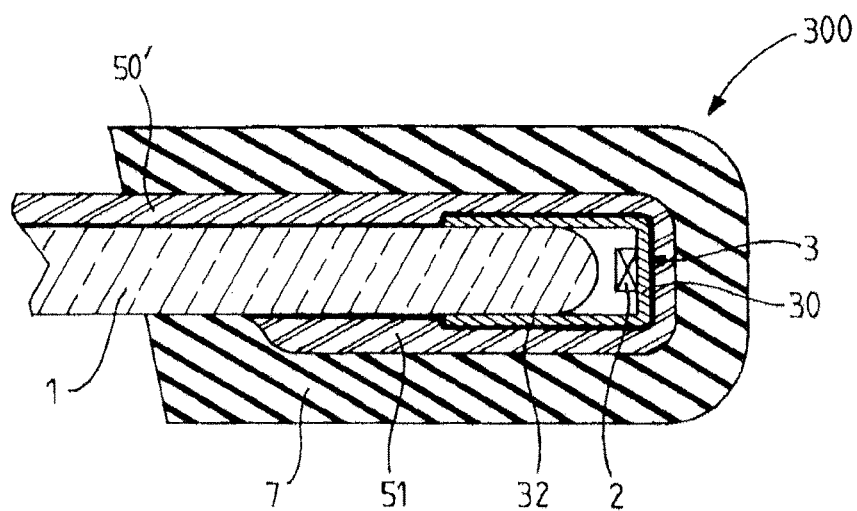

FIG. 3 shows a partial schematic view in cross section of a diode module 300 in a third embodiment of the invention.

This module 300 differs from the module 210 in that:
 the laminated glazing is (optionally) replaced by a single glazing, for example made of a plastic, for example PC, and the lamination interlayer is (optionally) replaced by at least one functional film, for example a light-extraction film 50' made of PU, PP or PE with an adhesive-coated side that makes contact with the glazing; and
 the protruding part 51 of this film this time covers the U-shaped diode bracket 3.

In addition, the protruding part envelopes the bracket 3 and bonds to the face 12.

Finally, the U-shaped bracket may have a uniform cross section, with (full) flanges of equal dimensions.

Figure 4:
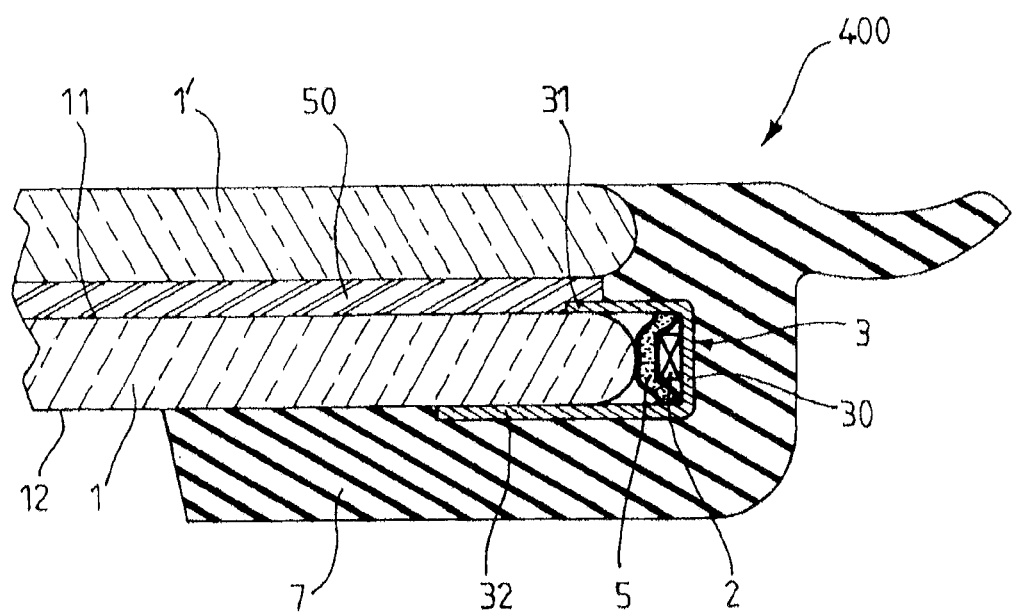

FIG. 4 shows a partial schematic view in cross section of a diode module 400 in a fourth embodiment of the invention.

This module 400 differs from the module 100 in the means for sealing against the encapsulation material.

This is because the external adhesive strip has been removed (it may also be kept) and replaced with a double-sided adhesive strip 5 (either discontinuous, per (group of) diode(s), or of a single piece for all the diodes) that envelopes the chips and adheres to the edge face of the glazing 10.

The radiation emitted by the diodes passes through the double-sided strip. The light-emission volume (the region between the chips and the coupling edge face, bounded by the emissions of the furthest diodes) is also protected by this strip.

Figure 5:
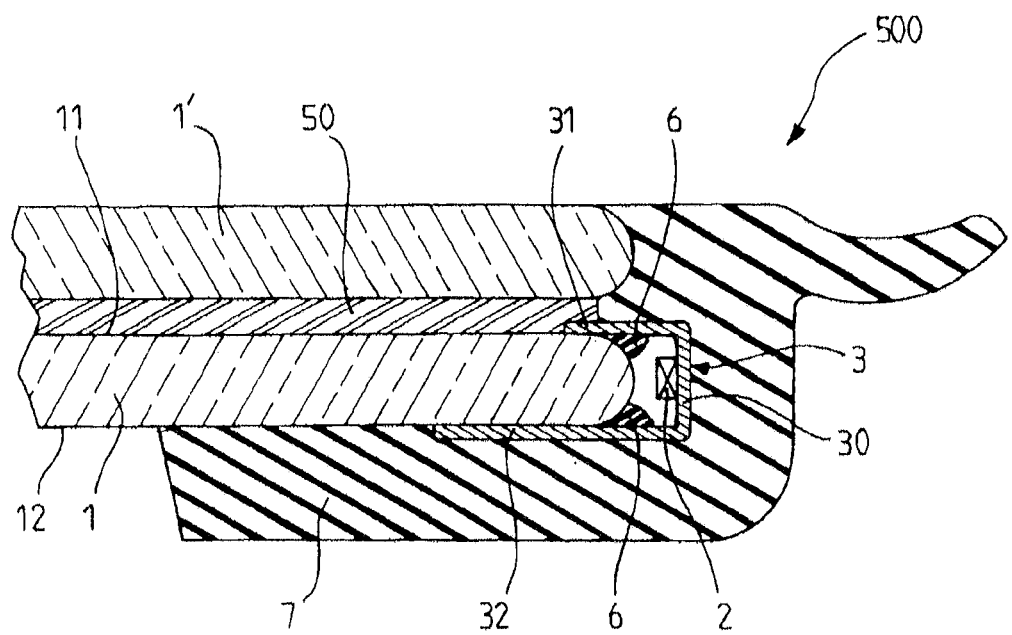
Figure 6:
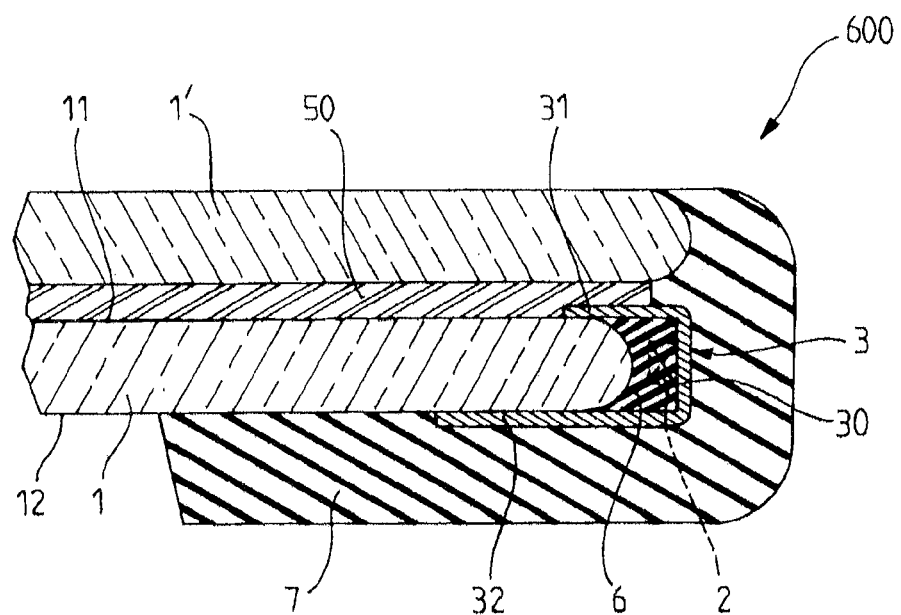
Figure 7:
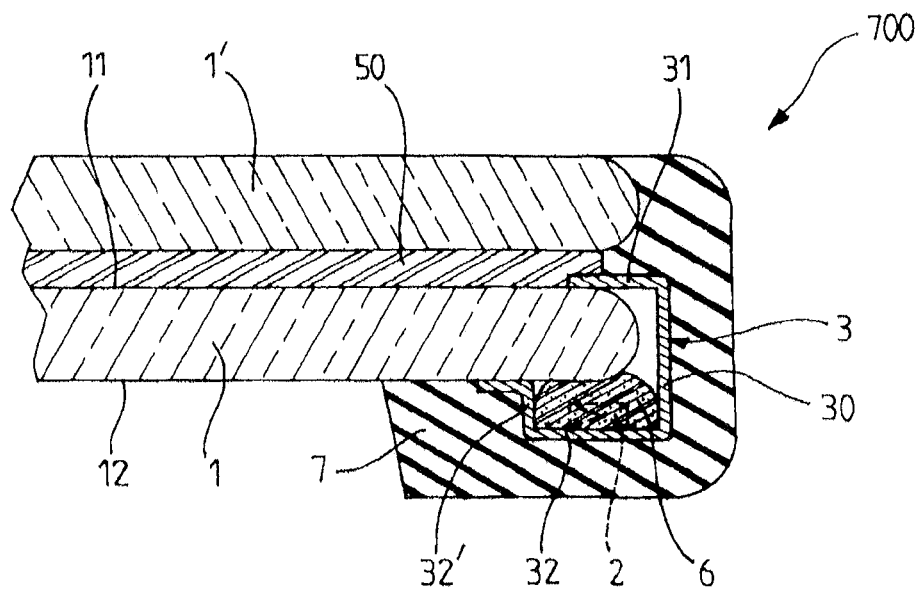

FIGS. 5 to 7 show partial schematic views in cross section of diode modules 500 to 700 in embodiments of the invention.

The module 500 differs from the module 100 in the means of sealing against the encapsulation material, namely an adhesive 6 in contact regions between the bracket and the glazing.

This adhesive is chosen to be transparent at said wavelength(s) of the diodes if it occupies the light-emission volume.

Figure 1B:
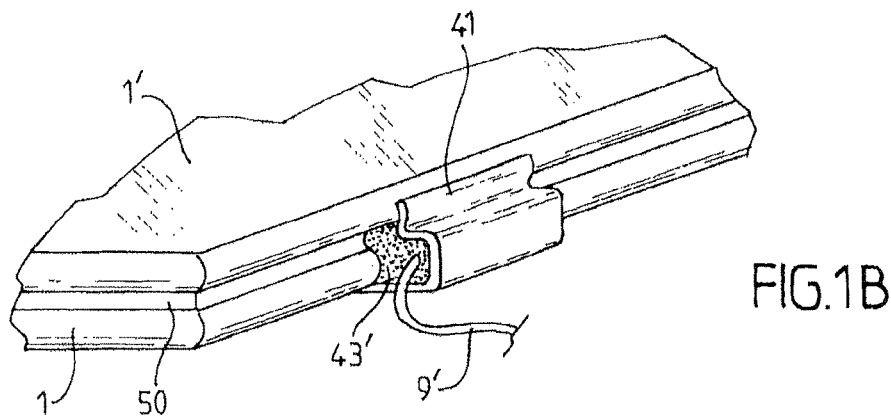
FIGS. 1B and 1C show partial schematic side views of a diode module in an embodiment of the invention.
Figure 1C:
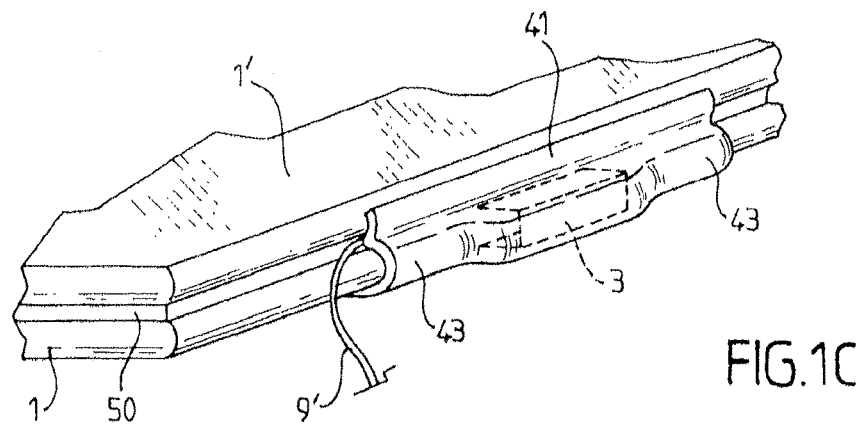
Figure 1D:
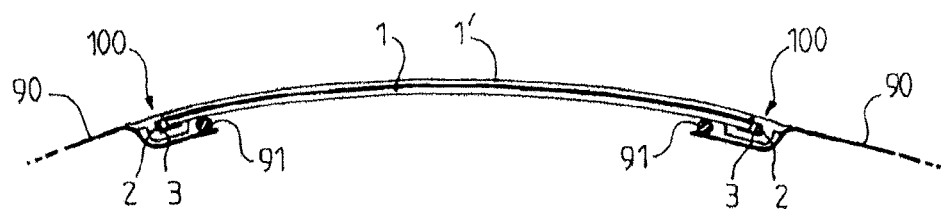
FIGS. 1D and 1E show partial schematic views in cross section of an automobile roof with a diode module according to the invention.
Figure 1E:
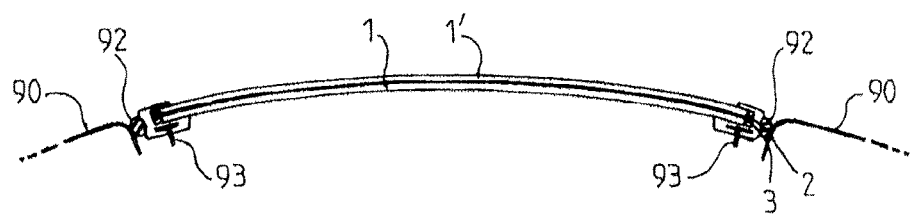

Naturally, preferably to this adhesive may be added a (similar or separate) adhesive or any other means for sealing the side parts of the bracket (as already described in FIG. 1B).

The module 600 differs from the module 100 in the means for sealing against the encapsulation material, namely an adhesive 6 embedding the chips and filling the entire volume between the edge face and the bracket.

This adhesive is chosen to be transparent at said wavelength(s) of the diodes because it occupies the light-emission volume. It also differs in that the first glass sheet is locally recessed and protruding on the two main faces so as to house the diodes and here the bracket, minimizing the width of the encapsulation, or, in a variant, the premounted seal, so as to maximize the size of the window region.

The module 700 differs from the module 600 in the placement of the chips 2, facing the face 12, and the consequent modification of the flange 32, with a volume for housing the chips and a sole 32' bearing against the face 12.

Figure 8:
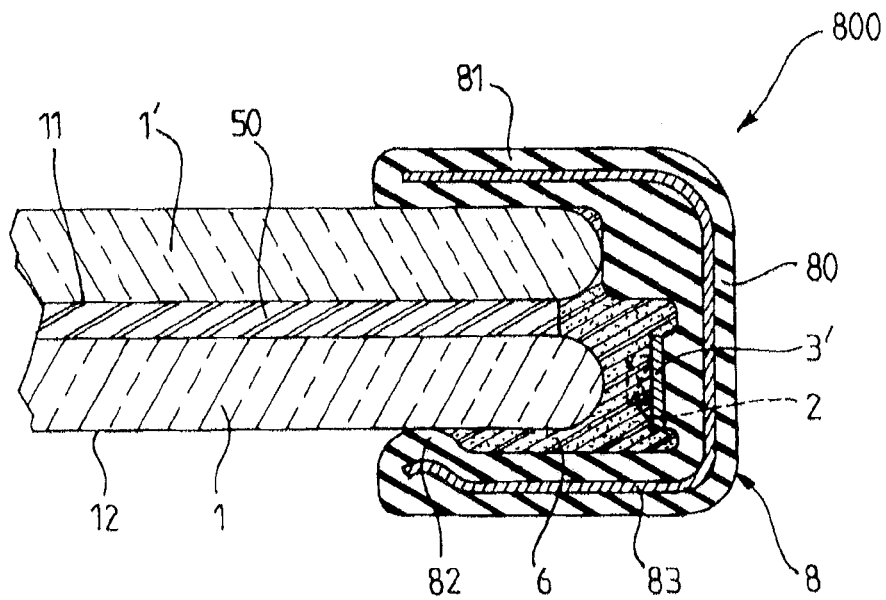

FIGS. 8 to 10 show partial schematic views in cross section of diode modules 800 to 1000 in embodiments of the invention.

These modules 800 to 1100 differ from the module 100 primarily in the absence of encapsulation and in the presence of a premounted seal.

The seal 80 of the module 800 is a seal 81 made of extruded EPDM having a uniform U-shaped cross section and containing a reinforcing metal core 83. The seal comprises an end 82 for clipping to the face 12. In this configuration, the seal 80 serves to fasten chips 2 to the glazing. The diode bracket 3' is a flangeless rectangular bracket, of rectilinear cross section, for example a PCB. The seal (against water, high-pressure washing, cleaning products, etc.) is ensured by way of an internal transparent adhesive 6.

In the modules 900 to 1100, the laminated glazing is replaced with single glazing, for example made of plastic, for example PC.

The seal 80 of the module 900 is a seal 81 made of extruded EPDM having a uniform U-shaped cross section and containing a reinforcing metal core 83. The seal comprises an end 82 for clipping to a recess in a masking layer 9 made of black polycarbonate bordering the face 12. In this configuration, the seal 80 serves to fasten chips to the laminated glazing. The diode bracket 3' is a flangeless rectangular bracket, of rectilinear cross section, for example a PCB. In the edge face a groove is provided for housing the diodes. The seal (against water, high-pressure washing, cleaning products, etc.) is ensured by way of an internal transparent adhesive 6.

As a variant, shown in FIG. 9a, the seal 80 is provided with sealing lips 80'. The internal adhesive is then not required thereby allowing the seal to be more easily demounted. However, the joining region at the ends of the seal may be sealed against water, high-pressure washing, cleaning products, etc. by any of the means described above.

The seal 70 of the module 1000 is a seal made of extruded TPE or EPDM 70 having a uniform U-shaped cross section.

The diode bracket 3' is an L-shaped bracket premounted on the seal 70 using an adhesive or any other means. The seal (against water, high-pressure washing, cleaning products, etc.) is ensured by way of an internal transparent adhesive 6.

FIG. 11 shows a partial schematic view in cross section of a diode module 1100 in an embodiment of the invention.

This module 1100 differs from the module 100 in the following:

the laminated glazing has been replaced with single PC glazing having a black PC masking layer on the periphery of the face 12;

it has a substantially U-shaped external adhesive strip 4; and its chips 6' are pre-encapsulated in a groove in the coupling edge of the glazing, which groove may or may not open onto another edge of the glazing.

If the strip 4 does not completely cover the sides, for a complete protection of the material 7 a sealing means such as an adhesive is added, sealing the groove so as to prevent penetration of fluid from the sides.

Figure 12:
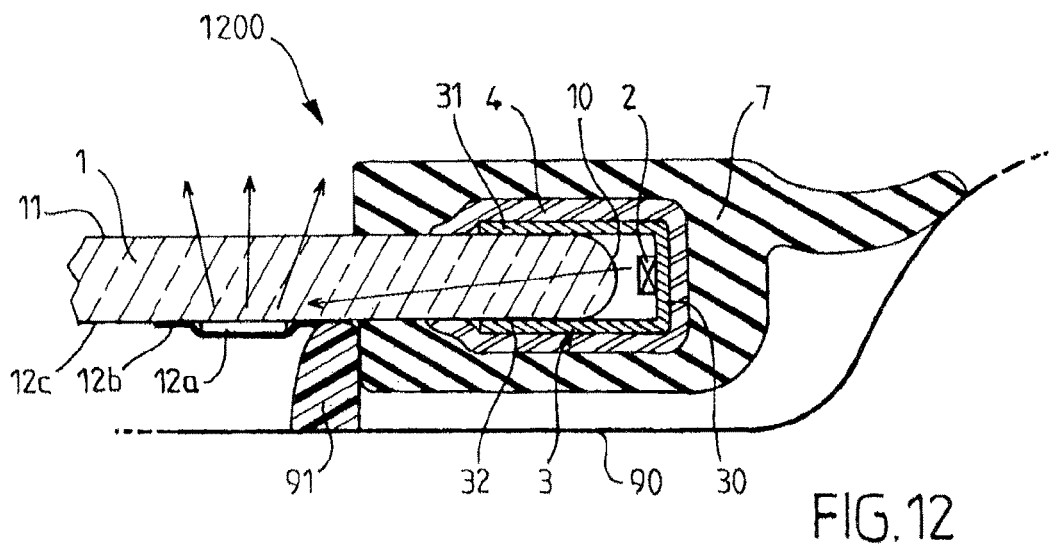

FIG. 12 shows a partial schematic view in cross section of a diode module 1200 according to another embodiment of the invention.

This module 1200 differs from the module 100 in the following:

the laminated glazing has been replaced with single PC glazing having a black PC masking layer on the periphery of the face 12;

it has a substantially U-shaped external adhesive strip 4; and it has a three-faced encapsulation.

Figure 13:
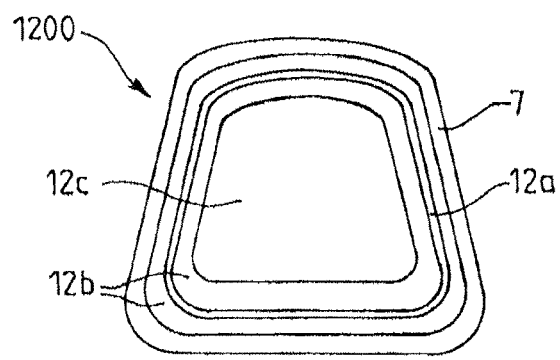
FIGS. 13 and 14 show, respectively, a partial schematic top view of diode modules in embodiments of the invention.
Figure 14:
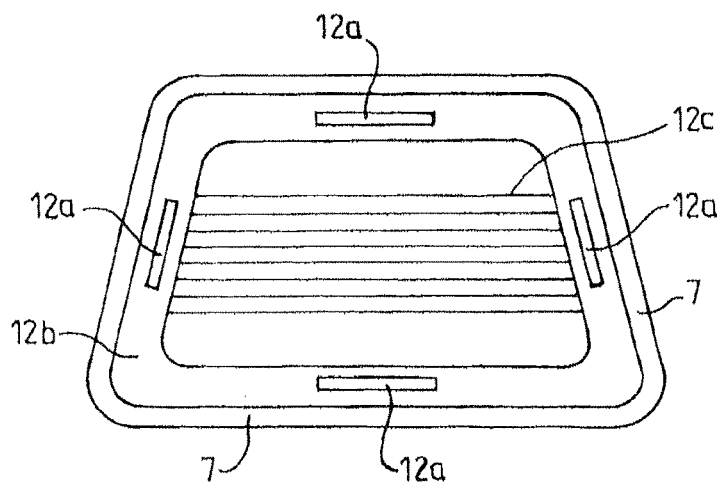

The extraction area 12*a* is covered with a black masking region 12*d*,

For example, this module is shown mounted on a side window (shown in FIG. 13) with a window region 12*d* or on a rear window for a land-based vehicle (a variant is shown in FIG. 14).

The light is seen from the exterior (means of locating the vehicle, for the side or rear window, brake light etc.).

Figure 15:
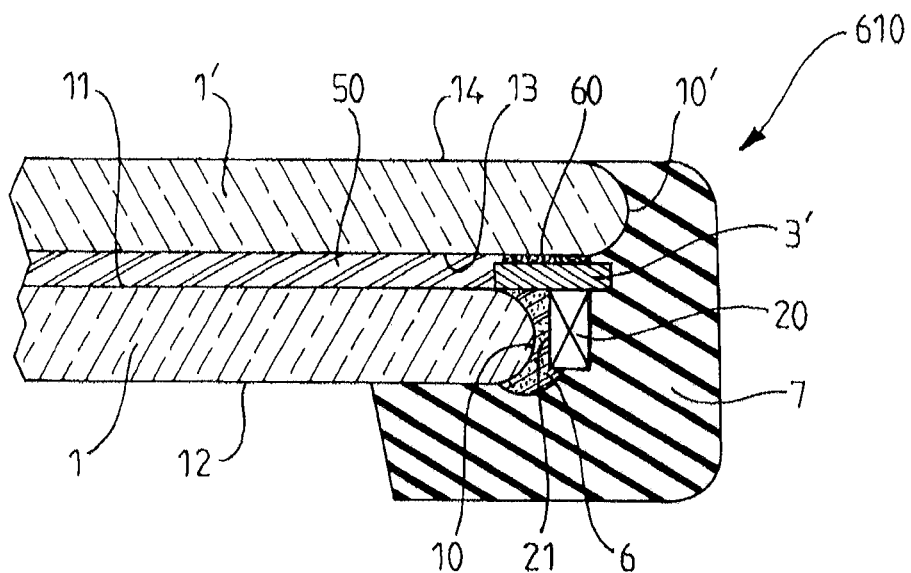

FIG. 15 shows a partial schematic view in cross section of a diode module 610 in an embodiment of the invention.

This module differs from the module 600 described in FIG. 6:

in the type of bracket, which is a simple rectangular strip 3', typically a PCB, made of plastic or even metal;

in the optional fastening of the bracket on the periphery of the lamination face 13 of the second glass sheet by way of an adhesive or a double-sided adhesive 60 which allows the bracket to be pre-positioned with the addition of adhesive sealing means in the coupling volume; and in the choice of diodes, here edge-emitting diodes, therefore with an emitting front side face 21 facing the edge face 10.

In this configuration, the rear face (and sides) of the diodes make contact with the encapsulation material 7. It has surprisingly been observed that the diodes can make contact with the material (beyond their emitting faces) because they withstand the conditions (especially the temperature) of encapsulation in polyurethane or in flexible thermoplastics, preferably injected at less than 250° C., even at 200° C.

Thus, generally, it is possible to use a bracket having a simple shape that does not form a screen between the encapsulation and the diodes (rather than a U-, J- or L-shaped bracket).

Furthermore, the bracket 3' is sufficiently wide to prevent stray light propagating through the border of the second sheet (and therefore being seen from the exterior) for example in the case of a flush encapsulation.

Naturally, it is still possible to provide a more extensive, especially L- or U-shaped, bracket.

As a variant (not shown), the internal sealing adhesive 6 is removed and an adhesive 60 is used for the bonding, and the coupling space is protected by surrounding the diodes and the bracket with an enveloping adhesive strip, for example analogous to that shown in FIG. 1*a*, and fastened to the edge face 10' and to the periphery of the face 12, beneath the encapsulation.

Figure 16:
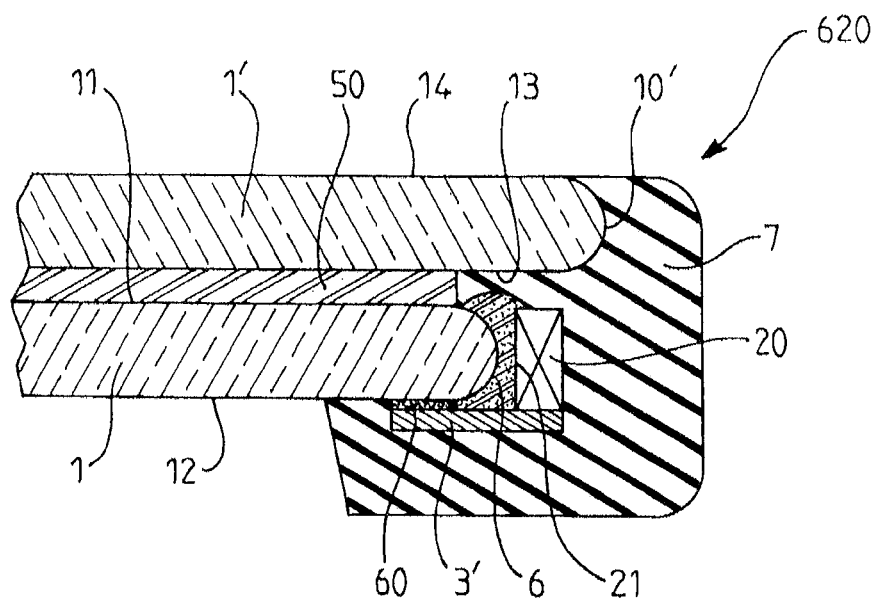

FIG. 16 shows a partial schematic view in cross section of a diode module 620 in an embodiment of the invention.

This module differs from the module 610 shown in FIG. 15 in the position of the bracket 3', here bonded to the periphery of the first main face 12 using an adhesive 60.

Naturally, a more extensive L-, U- or J-shaped bracket could be used (with a shorter flange on the face 13 especially to stop stray light).

As a variant it could be single glazing.

The invention claimed is:

1. A light-emitting module, comprising:
a glazing including two opposite main faces and an edge face, the glazing further including a first transparent sheet and a second transparent sheet that is laminated with the first transparent sheet, wherein at least part of a periphery of the second sheet extends beyond at least part of a periphery of the first transparent sheet so that a first main face of the second transparent sheet facing toward the first transparent sheet has a portion, located between said part of the periphery of the second sheet and said part of the periphery of the first transparent sheet, that is not laminated with the first transparent sheet;
a light source mounted to the glazing and configured to emit a radiation beam having a wavelength in the visible spectrum, the light source having an emitting surface, for emitting the radiation beam, positioned in said portion of the glazing that is located between said part of the periphery of the second sheet and said part of the periphery of the first transparent sheet, and
an encapsulation structure surrounding the edge face of the glazing and covering the light source.

2. The light-emitting module of claim 1, wherein the light source includes a plurality of light-emitting diodes.

3. The light-emitting module of claim 1, comprising a bracket for mounting the light source to the glazing.

4. The light-emitting module of claim 3, wherein the bracket is attached to said portion of the second transparent sheet.

5. The light-emitting module of claim 3, wherein the bracket is mounted to one or two of the two opposite main faces of the first transparent sheet.

6. The light-emitting module of claim 5, wherein the first transparent sheet includes a first main face that faces the first main face of the second transparent sheet and a second main face that is opposite the first main face, and wherein the bracket is mounted to the second main face of the first transparent sheet.

7. The light-emitting module of claim 1, wherein the emitting surface of the light source is arranged to face an edge face of the first transparent sheet that defines said part of the periphery of the first transparent sheet so that, in use, the radiation beam enters the first transparent sheet via the edge face of the first transparent sheet.

8. The light-emitting module of claim 1, wherein the encapsulation structure includes a polymeric encapsulation that extends from said part of the periphery of the second sheet to said part of the periphery of the first transparent sheet.

9. The light-emitting module of claim 8, wherein the polymeric encapsulation extends beyond the edge face of the glazing and covers at least a portion of one of the two opposite main faces of the glazing.

10. The light-emitting module of claim 9, wherein the rectangular strip is glued to one of the main faces of the first and/or second transparent sheets.

11. The light-emitting module of claim 8, wherein the polymeric encapsulation is flush with an exterior main face of the second transparent sheet that is opposite the first main face of the second transparent sheet.

12. The light-emitting module of claim 8, wherein the polymeric encapsulation covers a portion of a main face of the first transparent sheet.

13. The light-emitting module of claim 8, wherein the first transparent sheet includes a first main face that faces the first main face of the second transparent sheet and a second main face that is opposite the first main face, wherein the polymeric encapsulation covers at least part of the second main face of the first transparent sheet.

14. The light-emitting module of claim 8, comprising a bracket for mounting the light source to the glazing, wherein the polymeric encapsulation covers the bracket.

15. The light-emitting module of. claim 1, wherein the first transparent sheet and the second transparent sheet are glass sheets.

16. The light-emitting module of claim 1, wherein the encapsulation structure forms a seal against one or more fluids for protecting the light source.

17. The light-emitting module of claim 1, comprising a lamination interlayer arranged between the first transparent sheet and the second transparent sheet.

18. The light-emitting module of claim 1, comprising a seal arranged between the light source and the encapsulation structure.

19. The light-emitting module of claim 18, wherein the seal comprises an encapsulation material that is made of polyurethane or of a flexible thermoplastic chosen from a thermoplastic elastomer (TPE), polyvinyl chloride (PVC) and ethylene-propylene-diene-terpolymer (EPDM).

20. The light-emitting module of claim 1, comprising a bracket for mounting the light source to the glazing, wherein the bracket is a rectangular strip that is fastened to one of the main faces of the first and/or second transparent sheets.

21. A roof for a vehicle comprising the light-emitting module of claim 1.

22. A light-emitting module, comprising:
a glazing including two opposite main faces and an edge face, the glazing further including a first transparent glass sheet and a second transparent glass sheet that is laminated with the first transparent sheet via a lamination polymeric sheet arranged between the first transparent glass sheet and the second transparent glass sheet;
a light source mounted to the glazing and configured to emit a radiation beam having a wavelength in the visible spectrum, the light source having an emitting surface, for emitting the radiation beam, toward an edge face of the glazing;
a bracket for supporting the light source, the bracket mounted to at least one of the main faces of the first transparent glass sheet and the second transparent glass sheet, and
a polymeric encapsulation structure surrounding the edge face of the glazing and covering the bracket.

* * * * *